United States Patent [19]

Kuki et al.

[11] Patent Number: 5,009,035
[45] Date of Patent: Apr. 23, 1991

[54] WINDOW REGULATOR APPARATUS

[75] Inventors: Nobuyuki Kuki, Toyohashi; Yukio Isomura, Chiryu; Hirokazu Suzumura, Toyota; Yoshikazu Sakakibara, Anjo; Hiroshi Ishihara, Kariya, all of Japan

[73] Assignee: Aisin Seiki Kabushiki Kaisha, Japan

[21] Appl. No.: 500,204

[22] Filed: Mar. 28, 1990

[30] Foreign Application Priority Data

Mar. 29, 1989 [JP] Japan ................ 1-35805[U]

[51] Int. Cl.⁵ .............................................. E05F 11/48
[52] U.S. Cl. ............................................ 49/352; 49/374
[58] Field of Search ............... 49/348, 349, 350, 351, 49/352, 227, 415, 419, 423, 374, 375

[56] References Cited

U.S. PATENT DOCUMENTS

| | | | |
|---|---|---|---|
| 3,466,802 | 9/1969 | Doveinis et al. | 49/374 X |
| 3,466,803 | 9/1969 | Packett | 49/374 X |
| 4,069,617 | 1/1978 | Koike | 49/374 X |
| 4,633,613 | 1/1987 | Kobayashi et al. | 49/352 X |
| 4,663,886 | 5/1987 | Nakamura et al. | 49/352 X |
| 4,759,653 | 7/1988 | Maekawa et al. | 49/352 X |
| 4,821,589 | 4/1989 | Fukumoto et al. | |
| 4,829,630 | 5/1989 | Church et al. | 49/374 X |
| 4,848,033 | 7/1989 | Sasaki et al. | 49/352 |

Primary Examiner—Philip C. Kannan
Attorney, Agent, or Firm—Finnegan, Henderson, Farabow, Garrett & Dunner

[57] ABSTRACT

A window regulator apparatus includes a guide rail fixed within a vehicle door, a bracket including a window supported on the guide rail, a driving mechanism fixed within the door for moving the window up and down the guide rail, resilient members interposed between the guide rail and bracket, and shoes interposed between the resilient means and guide rail to compress the resilient means and circumvent rattling of the window.

7 Claims, 2 Drawing Sheets

WINDOW REGULATOR APPARATUS

BACKGROUND OF THE INVENTION

1. Field of the Invention

This invention relates generally to a window regulator apparatus, and more particularly to a wire-type window regulator.

2. Description of the Related Art

Generally, a wire-type window regulator is known in the prior art, as shown, for example, by Japanese Utility Model Laid-Open No. 62 (1987)-671. This window regulator comprises a door, a window glass supported in the door for movement upwardly and downwardly, a guide rail fixed in the door and supporting rotatable pulleys at upper and lower portions thereof, a driving mechanism laterally attached between the pulleys to the door, and a wire connected to the driving mechanism and looped around the pulleys, A bracket is connected to the window glass and attached to the wire, and ocntains a roller fixed thereto which is slidably mounted on the guide rail. By actuation of the driving mechanism, the wire is pulled and causes movement of the bracket on the guide rail. Thus, the window glass is moved upwardly and downwardly.

In the prior art there is a problem of rattling of the window glass in the longitudinal and transverse directions of the door. This rattling can be limited by reducing the clearance between the roller and guide rail as much as possible. However, it has been found difficult to control this clearance; and reduction of this clearance, while limiting rattling, can lead to interference between the roller and guide rail, thereby causing difficulty in operation, reduced performance and the generation of undesired noise. If the clearance is once again enlarged, the sub-standard operation generated by interference between the roller and window glass can be reduced; however, rattling of the window glass increases.

SUMMARY OF THE INVENTION

One of the objects of the present invention is to provide an improved window regulator apparatus that overcomes the foregoing disadvantage of the prior art.

Another object of the present invention is to provide an improved window regulator appartus, wherein resilient members and shoes are interposed between a guide rail and window bracket, whereby compression of the resilient members by the shoes serves to prevent rattling of the window glass without degrading the performance of the window regulator apparatus.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the window regulator apparatus of this invention comprises a guide rail, a window glass, a bracket movably supported on the guide rail, the window glass attached to the bracket, driving means for moving the bracket and thereby the window glass along the guide rail in an upward and downward direction, resilient means interposed between the guide rail and bracket, and shoes interposed between the resilient means and guide rail for compressing the resilient means in two directions to reduce rattling of the window.

The accompanying drawings, which are incorporated in and constitute a part of this specification, illustrate one embodiment of the invention and, together with the description, serve to explain the objects, advantages and principles of the invention.

DETAILED DESCRIPTION OF THE PREFERRED EMBODIMENT

Figure 1:
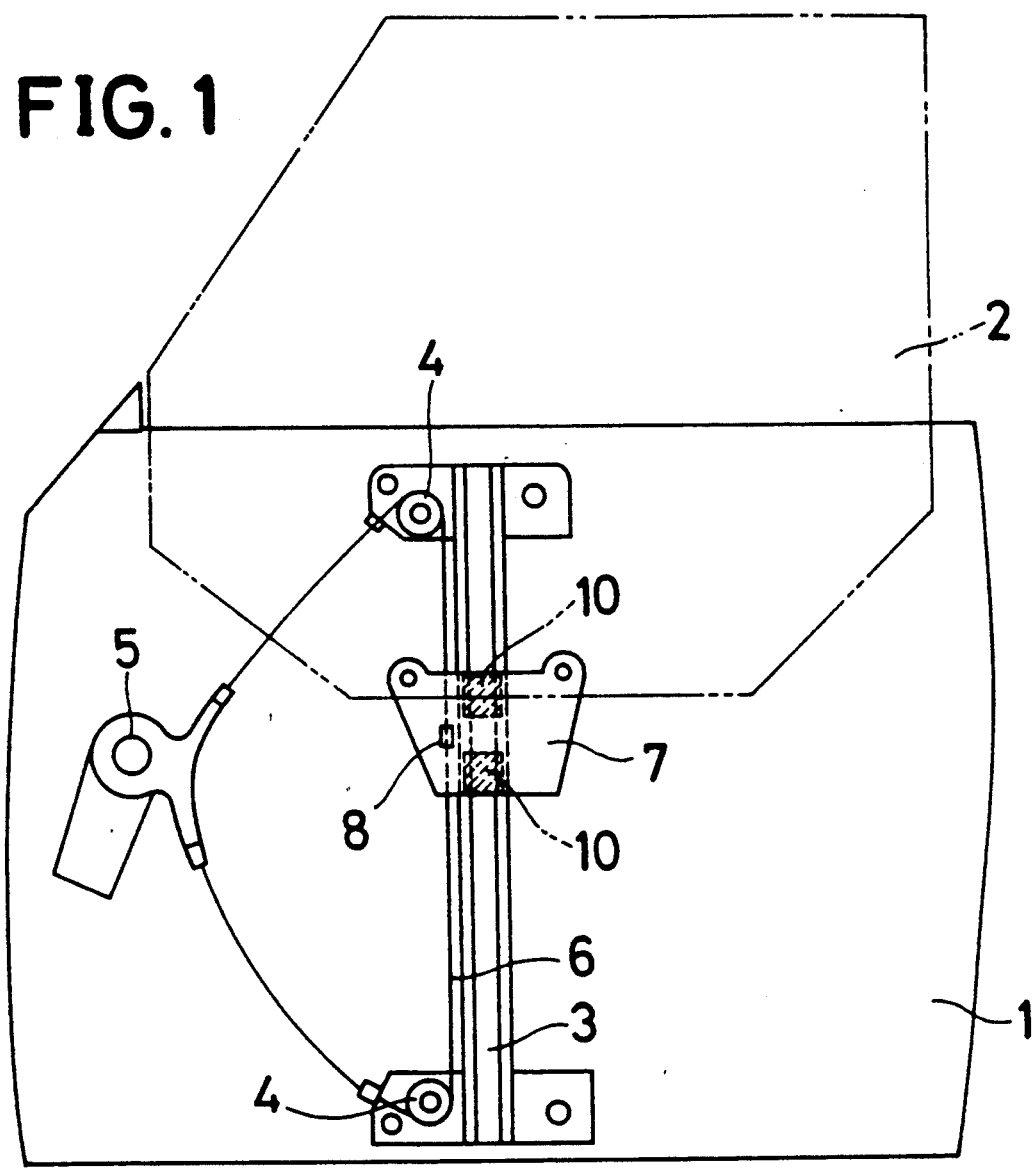
FIG. 1 shows a front view of a window regulator apparatus in elevation constructed according to the prsent invention.
Figure 2:
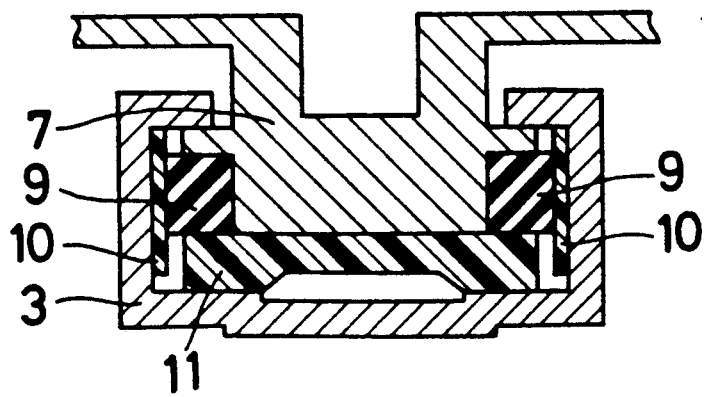
FIGS. 2, 3 are top and side enlarged sectional views of a portion of the guide rail and bracket shown in FIG. 1.
Figure 3:
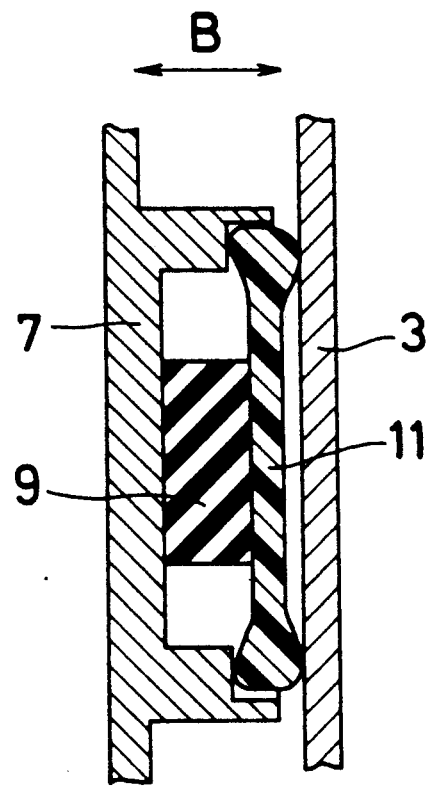
Figure 4:
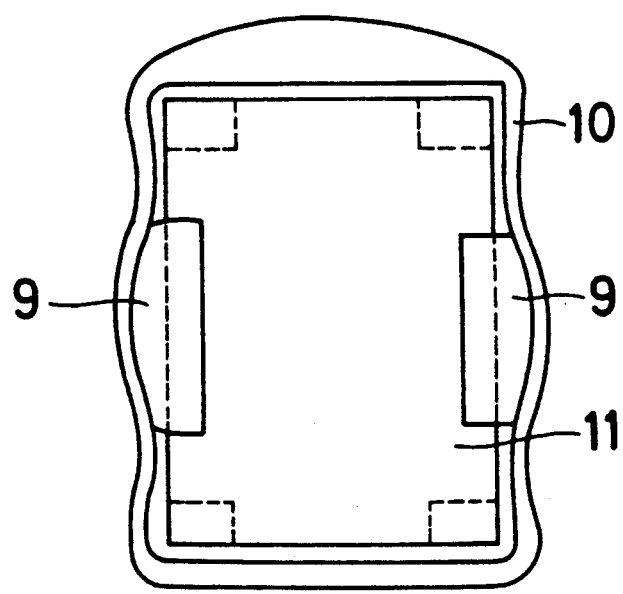
FIG. 4 is an enlarged elevation view of the shoes and resilient means of FIGS. 1 and 2.

Referring to FIG. 1, a window glass 2 is shown movably disposed in a door 1 for movement up and down. A guide rail 3 is fixedly connected in the door 1. Guide means 4,4 are rotatably mounted at the upper and lower portions of the guide rail 3. Preferably, guide means 4,4 are pulleys. A conventional driving mechanism or winder 5 is laterally spaced between pulleys 4,4 and is fixed to the door 1. A wire 6 is looped around pulleys 4,4 and coupled to driving mechanism 5 to form a generally triangular shape, as shown. A bracket 7 is attached to a lower portion of the window glass 2, and the wire 6 is affixed to the bracket 7 through a hook 8. The bracket 7 is movably supported on guide rail 3 and thus capable of upward and downward movement.

When the dirving mechanism 5 of the window regulator apparatus is acutated, the wire 6 is caused to move around pulleys 4,4 which causes movement of the bracket 7 on guide rail 3. Because the window glass 2 is attached to bracket 7, it also moves along the guide rail 3 either upwardly or downwardly depending on the direction of actuation of the driving mechanism 5.

As shown in FIGS. 1 to 4, shoes 10, 11 are interposed between the resilient members 9,9 and guide rail 3. As better seen in FIG. 4, shoes 10 are preferably formed as deformable, exterior, vertical portions of bracket 7. When the bracket and guide rail are assembled, shoes 10 are deformed inwardly by inside vertical surfaces of guide rail 3. The shoes 10, 11 compress the resilient members 9,9 in two directions substantially orthogonal to each other. Thus, vibration or movement of the bracket 7 in the longitudinal direction of the door 1 (direction A shown in FIG. 2) against the guide rail 3 is absorbed by deflection of the resilient members 9 against the shoes 10, and vibration of the bracket 7 in the transverse direction of the door 1 (direction B shown in FIG. 3) against the guide rail 3 is absorbed by deflection of the resilient members 9 against the shoe 11. Thus, rattling is virtually eliminated.

In summary, rattling of the bracket 7 against the guide rail 3 is absorbed by the resilient members 9, resulting in reduction in rattling of the window glass 2 in both the longitudinal and transverse directions. Furthermore, movement of the bracket 7 in guide rail 3 is not adversely affected by the presence of shoes 10, 11 which can be made of nylon or other low-friction material. 124 performance of the window regulator apparatus does not suffer.

As shown in FIG. 1, a separate combination of resilient members 9 and shoes 10, 11 is positioned at each of two spaced apart vertical locations on the bracket 7. Thus, any tendency of the bracket to rotate about the center of shoes 10, 11 if only a single combination was used is removed, and the stability of the window glass 2 is improved.

According to the present invention, the window regulator apparatus includes the window glass 2 movable supported within the door 1 for upward and downward movement, the guide rail 3 fixedly connected to the door 1 and rotatably supporting pulleys 4,4, the driving mechanism 5 laterally mounted in the door 1 between pulleys 4,4, the wire 6 looped around the pulleys 4,4 and driving mechanism 5, and the bracket 7 fixed to the window glass 2 and connected to the wire 7. The shoes 10, 11 are interposed between the guide rail 3 and bracket 7 and compress the resilient members 9,9. Consequently, rattling of the window glass 2 in the longitudinal and transverse directions of the door 1 can be avoided without interference by the shoes 10,11 upon the movement of the bracket 7 in guide rail 3. As a result, both the generation of noise and unsatisfactory performance of the window regulator can be averted.

The invention which is intended to be protected herein should not be construed as limited to the particular forms disclosed, as these are to be regarded as illustrative rather than restrictive. Variations and changes may thus be made by those skilled in the art without departing from the scope and spirit of the invention as set forth in the appended claims and their equivalents.

What is claimed is:

1. A window regulator apparatus, comprising:
   a guide rail having inner vertical surfaces;
   a window glass;
   a bracket movably supported on said guide rail and having outer vertical surfaces, said window glass attached to said bracket;
   driving means for moving said bracket and thereby said window glass along said guide rail in an upward and downward direction;
   resilient means positioned between said inner vertical surfaces of said guide rail and said outer vertical surfaces of said bracket; and
   shoes interposed between said resilient means and guide rail for compressing said resilient means in two directions to reduce rattling of the window.

2. A window regulator apparatus as set forth in claim 1. wherein said shoes include first and second shoes.

3. A window regulator apparatus as set forth in claim 2, wherein said first shoes are positioned between the inner vertical surfaces of said guide rail and said resilient means.

4. A window regulator apparatus as set forth in claim 3, wherein said resilient means includes a pair of resilient members having front surfaces, and said second shoe is positioned between the front surfaces of said resilient members and an inner vertical surface of said guide rail.

5. A window regulator apparatus for mounting within a vehicle door, comprising:
   a guide rail connected within the door and having inner vertical surfaces;
   guide means rotatably mounted on said guide rail;
   a window glass;
   a bracket movably supported on said guide rail and having outer vertical surfaces, said window glass attached to said bracket;
   driving means mounted within the door for moving said bracket and thereby said window glass up and down said guide rail;
   a wire extending between said driving means and said bracket, said wire passing around said guide means and serving to transmit a moving force from said driving means to said bracket;
   resilient means positioned between said inner vertical surfaces of said guide rail and said outer vertical surfaces of said bracket; and
   a plurality of shoes interposed between said resilient means and guide rail for compressing said resilient means in two directions to reduce rattling of the window.

6. A window regulator appartus as set forth in claim 5, wherein certain of said plurality of shoes are positioned between the inner vertical surfaces of said guide rail and said resilient means.

7. A window regulator apparatus as set forth in claim 6, wherein said resilient means includes a pair of resilient members having front surfaces, and another of said plurality of shoes is positioned between the front surfaces of said resilient members and an inner vertical surface of said guide rail.

* * * * *